3,359,274
2-(2-PICOLYLAMINO)-2-IMIDAZOLINE
DERIVATIVES
John Evlyn Warner Billinghurst, London, England, assignor to Burroughs Wellcome & Co. (U.S.A.) Inc., Tuckahoe, N.Y., a corporation of New York
No Drawing. Filed June 25, 1964, Ser. No. 378,050
Claims priority, application Great Britain, June 25, 1963, 25,229/63
3 Claims. (Cl. 260—296)

The present invention relates to a series of novel chemical compounds which possess diuretic properties, to the method of preparing them, and to pharmaceutical preparations containing them.

The novel chemical compounds of the present invention have the general Formula I:

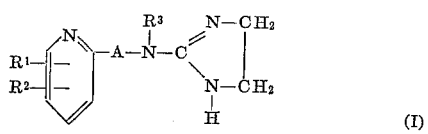

wherin $R^1$ and $R^2$ are the same or different and each is a hydrogen atom or a lower alkyl group, A is a methylene or ethylene group or is absent altogether and merely represents the bond between the pyridyl group and the nitrogen atom, and $R^3$ is a hydrogen atom or a lower alkyl group. In this specification wherever the symbols $R^1$, $R^2$, A, and $R^3$ appear they are to be understood as having the same meanings as hereinbefore defined, and "lower alkyl group" is to be construed as meaning an alkyl group having from 1 to 4 carbon atoms, unless it is otherwise defined. The compounds of Formula I are basic compounds and are usually isolated as acid addition salts. Thus in one aspect the present invention provides the compounds of Formula I and acid addition salts thereof.

The compounds of Formula I may be made by adaptation of many of the well known methods for coupling two heterocyclic basic precursors together via an amino group. Thus if the pyridyl group, optionally substituted with one or two alkyl groups, is denoted by the symbol py and the imidazol-2-in-2-yl group is denoted by im then the following route is available.

A compound py AX may be reacted with a compound Y im wherein one of the groups X and Y is an amino group —$NR^3H$ and the other group is a proton accepting group such as a halogen atom or p-toluene-sulphonate group or in the case where X is the amino group Y may be a group $R^4S$— or $R^4O$— wherein $R^4$ is a lower alkyl group, preferably methyl or ethyl, or an aralkyl group such as benzyl.

Alternatively the compounds may be prepared by synthesising the imidazoline ring as the last stage by means of an internal condensation of a compound py A $$N(R^3)C(X^1)NHCH_2CH_2Y^1$$

wherein $X^1$ may be a group $R^4S$ or $R^4O$ as defined above when $Y^1$ is an amino group, or $X^1$ may be an amino group when $Y^1$ is an amino group or a reactive ester group such as a halogen atom.

The preferred method is the reaction of an amine py A $NR^3H$ with 2-methylmercapto-2-imidazoline $CH_3S$-im.

Thus in another aspect the present invention provides the above defined methods for preparing the compounds of Formula I.

It has been discovered that the compounds of Formula I possess diuretic properties. When administered either orally or parenterally they produce diuresis in the rat, guinea-pig, and dog without inducing tolerance. They possess potencies similar to those of the thiazide-type diuretics and have certain advantages. For example, in tests with rats they have been shown to cause a smaller loss of potassium from the body than do the thiazide-type diuretics.

Thus in yet another aspect the present invention provides a method of producing diuresis by the administration of a compound of Formula I. Typical conditions which require water to be removed from the body are oedema and ascites in cardiac failure, pulmonary oedama, and hypertension.

The compounds may be administered either orally or parenterally, though the oral route is preferred. When administered orally they are active at doses from about 2 mg./kg. body weight upwards and a suitable oral dose for producing diuresis in man would probably be in the range 100 mg. to 2 g. per day according to the severity of the condition requiring the diuretic therapy and the response of the patient; the dose would preferably be in the range of 250 mg. to 1 g. per day.

The preferred compounds are 2-(2-picolylamino)-2-imidazoline and 2-[N-(6-methyl-2-picolyl)amino-2-imidazoline.

The compounds of the present invention may be presented in any of the usual pharmaceutical formulations for oral or parenteral administration or in suppositories. Thus the compounds may be presented in aqueous or non-aqueous injectable solutions with or without the addition of other inert substances to render the solution isotonic with the blood, bacteriostatic agents, colouring agents, and other substances often added to injectable solutions. The preferred method of administration though is orally and the compounds may be presented in tablets, capsules, cachets, powders, granules, or as a solution or suspension in aqueous, non-aqueous, or emulsified liquid, or any other method well known to the art for oral presentation. To these formulations may be added where appropriate and where necessary, diluents, solutes, solvents, buffers, flavouring, binding, dispersing, surface-active, thickening, lubricating, and coating materials, preservatives, antioxidants, bacteriostats, and any other acceptable carriers and excipients.

Thus in yet another aspect the present invention provides pharmaceutical formulations containing a compound of Formula I.

These formulations may be made by any of the well known pharmaceutical formulation techniques such as compressing, grinding, simple admixing of the components, or any other known techniques.

Thus in still one further aspect the present invention provides methods of preparing pharmaceutical preparations containing a compound of Formula I.

The invention will now be described by reference to the following examples in which all temperatures are given in degrees Celsius.

*Example 1*

A solution of 2-methylthio-2-imidazoline hydriodide (24.4 g.; 0.1 mol) and 2-picolylamine (11.9 g.; 0.11 mol) in dimethylformamide (12 ml.) is allowed to stand for 48 hours, the majority of the solvent is evaporated off in vacuo on a steam-bath and the residue is triturated with acetone to give 2-(2-picolylamino)-2-imidazoline hydriodide, M.P. 145° C., after crystallisation from ethanol.

*Example 2*

A mixture of 2-methylthio-2-imidazoline hydriodide (24.4 g.; 0.1 mol) and 6-methyl-2-picolylamine (13.4 g.; 0.11 mol) in water (5 ml.) is heated on a steam-bath until evolution of methylmercaptan ceases (ca. ¼-hr.). The reaction mixture is triturated with acetone to give 2-[2 - (6-methylpicolyl)amino]-2-imidazoline hydriodide, M.P. 167–168°, after crystallisation from ethanol.

Example 3

2 - [2-(pyridyl)ethylamino]-2-imidazoline hydriodide, M.P. 158–159°, after crystallisation from ethanol, is prepared by the method of Example 2.

Example 4

2 - [N-methyl-N-2-(2-pyridyl)ethylamino]-2-imidazoline hydriodide monohydrate, M.P. 115–117°, after crystallisation from ethanol, is prepared by the method of Example 2.

Example 5

2 - (6-methyl-2-picolyl)methylamino-2-imidazoline hydriodide, M.P. 121–123°, after crystallisation from ethanol, is prepared by the method of Example 2.

Example 6

A solution of (6-methyl-2-picolyl)isothiocyanate (8.2 g., 0.05 mol) and ethylenediamine (3.0 g.; 0.05 mol) in methanol (100 ml.) is refluxed 5 hours and the solvent is evaporated to give crude N-(2-aminoethyl)-N'-(6-methyl-2-picolyl)thiourea as a thick red oil.

A solution of the above crude substituted thiourea (8.5 g.; 0.038 mol) and methyliodide (5.4 g.; 0.038 mol) in methanol (100 ml.) is refluxed for 5 hours and the solvent is evaporated. The residual gum is triturated with a mixture of ether and acetone and the resulting solid is crystallised from ethanol to give 2-[2-(6-methylpicolyl)amino]-2-imidazoline hydriodide, M.P. 167–168°.

I claim:
1. A compound of Formula I

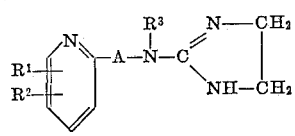

(I)

and acid addition salts thereof, wherein $R^1$ and $R^2$ are the same or different and each is a hydrogen atom or an alkyl group of 1 to 4 carbon atoms, A is a methylene or ethylene group or is absent altogether and merely represents the bond between the pyridyl group and the nitrogen atom, and $R^3$ is a hydrogen atom or a lower alkyl group.

2. A compound selected from the group consisting of 2 - (2-picolylamino)-2-imidazoline and pharmaceutically acceptable addition salt thereof.

3. A compound selected from the group consisting of 2 - [N - (6-methyl-2-picolyl)]amino-2-imidazoline and pharmaceutically acceptable addition salt thereof.

References Cited

UNITED STATES PATENTS 1,912,849   6/1933   Kranzlein et al. ____ 260—309.6

FOREIGN PATENTS 1,135,916   5/1963   Germany.
1,135,917   5/1963   Germany.

WALTER A. MODANCE, *Primary Examiner.*

J. RANDOLPH, *Examiner.*

A. ROTMAN, *Assistant Examiner.*